United States Patent
Wagner

(10) Patent No.: US 7,101,287 B1
(45) Date of Patent: Sep. 5, 2006

(54) SPORTS TRAINING APPARATUS AND SPORTS TRAINING SYSTEM

(76) Inventor: Herrmann Wagner, Gartengasse 7, A-2721 Bad Fischau (AT)

(*) Notice: Subject to any disclaimer, the term of this patent is extended or adjusted under 35 U.S.C. 154(b) by 0 days.

(21) Appl. No.: 09/959,116

(22) PCT Filed: Apr. 18, 2000

(86) PCT No.: PCT/AT00/00096

§ 371 (c)(1),
(2), (4) Date: Feb. 13, 2002

(87) PCT Pub. No.: WO00/62874

PCT Pub. Date: Oct. 26, 2000

(30) Foreign Application Priority Data

Apr. 21, 1999 (AT) .................................. 267/99 U

(51) Int. Cl.
*A63B 69/36* (2006.01)
(52) U.S. Cl. ...................... 473/207; 473/209; 473/221; 473/151
(58) Field of Classification Search ........ 473/151–153, 473/131, 221–224, 207–209, 219
See application file for complete search history.

(56) References Cited

U.S. PATENT DOCUMENTS

| 3,808,707 | A | | 5/1974 | Fink |
| 4,488,726 | A | * | 12/1984 | Murray ....................... 473/202 |
| 5,082,281 | A | | 1/1992 | Berghofer |
| 5,258,785 | A | | 11/1993 | Dawkins, Jr. |
| 5,372,365 | A | * | 12/1994 | McTeigue et al. .......... 473/409 |
| 5,588,919 | A | * | 12/1996 | Nakamura ................... 473/212 |
| 5,871,406 | A | * | 2/1999 | Worrell ....................... 473/221 |
| 6,141,643 | A | * | 10/2000 | Harmon ....................... 704/271 |
| 6,162,185 | A | * | 12/2000 | Amano et al. ............... 600/557 |
| 6,590,536 | B1 | * | 7/2003 | Walton ........................ 342/463 |
| 6,640,202 | B1 | * | 10/2003 | Dietz et al. ................. 702/167 |

FOREIGN PATENT DOCUMENTS

EP 0641574 3/1995

* cited by examiner

*Primary Examiner*—John M. Hotaling, II
(74) *Attorney, Agent, or Firm*—Drinker Biddle & Reath LLP; Daniel A. Monaco

(57) ABSTRACT

A sports training apparatus for sports in which a ball or the like are played with a racket or the like, comprising a programmable microcomputer, an acoustic device and at least one input device, wherein the microcomputer can be controlled by the input device to output acoustic signals indicating specific motions by means of acoustic output devices and for changing the duration, interval and quality of said signals. The invention aims at providing a sports training device which is lasting and practical to use, e.g., small, lightweight and relatively easy and simple to use and offering mental support for practicing said sport. To this end, the microcomputer, the acoustic device and at least part of the input device are located in a casing having the form of a wrist-watch. The acoustic device comprises a voice generator for generating at least two different words. Part of the input device is formed by a push switch that starts execution of the microcomputer program, is retained by a cap that can be slid back by the finger of the sportsman and is fitted with a radio transmitter connected to the microcomputer.

9 Claims, 1 Drawing Sheet

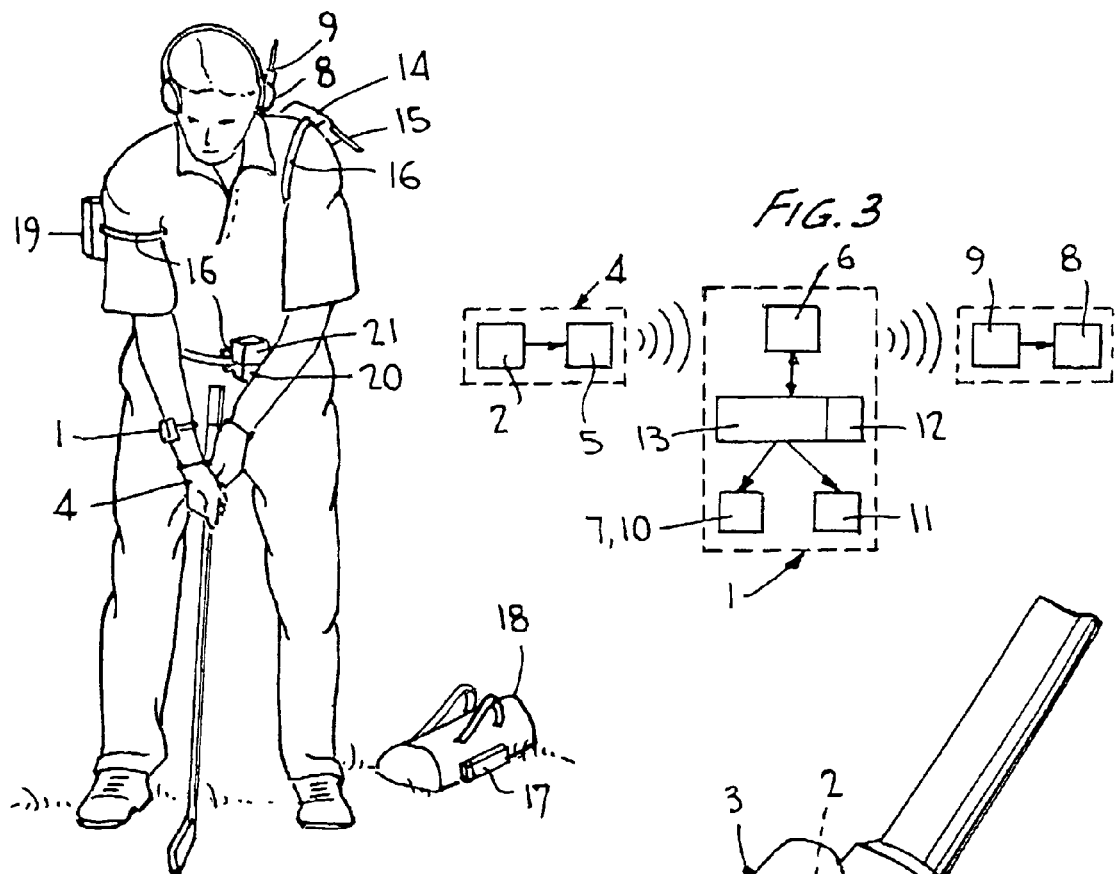
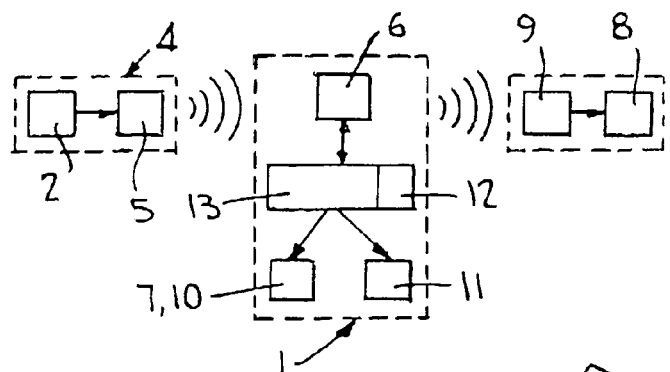
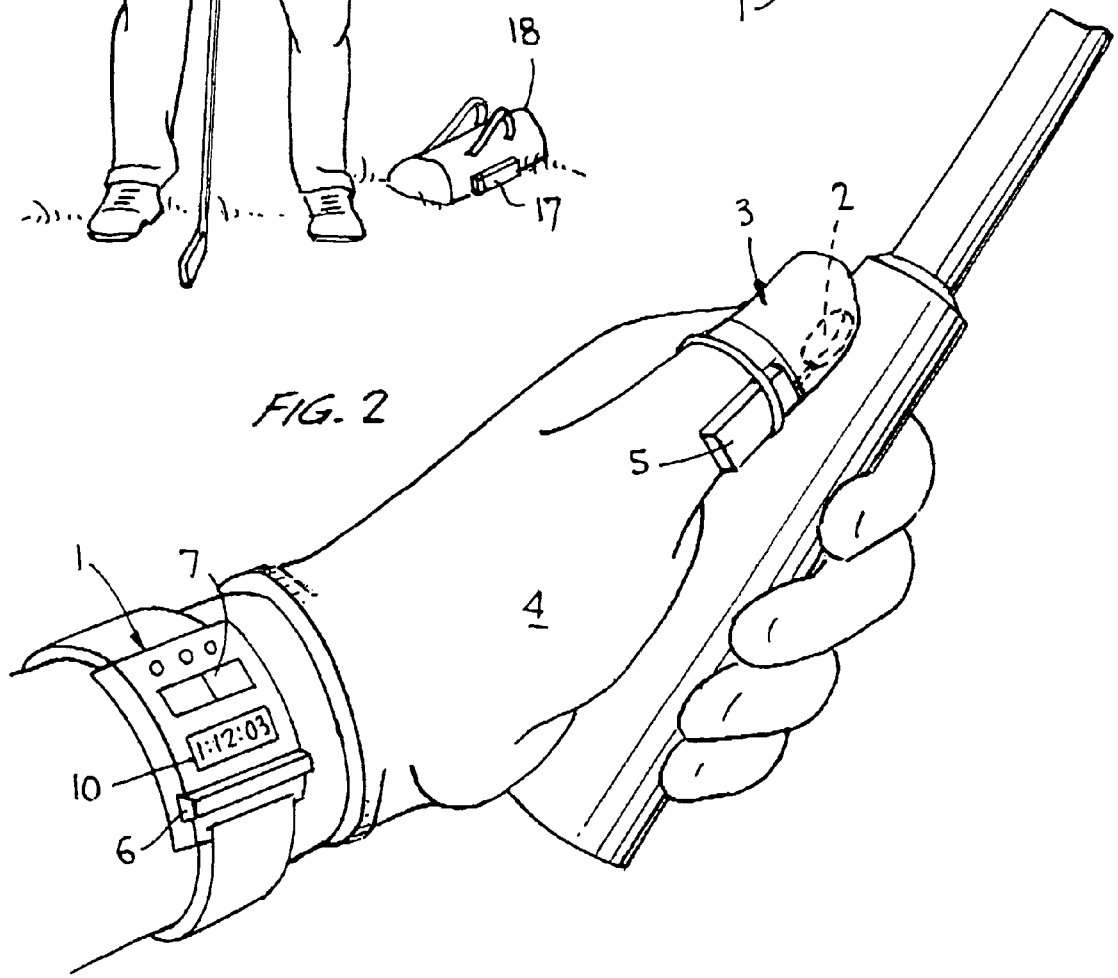

SPORTS TRAINING APPARATUS AND SPORTS TRAINING SYSTEM

CROSS-REFERENCE RELATED APPLICATION

This application is a U.S. national phase of PCT/AT00/00096, filed 18 Apr. 2000, which claimed priority of Austrian Application No. GM 267/99, filed 21 Apr. 1999.

BACKGROUND OF THE INVENTION

The invention relates to a training apparatus for the types of sport in which a ball or the like are played with a racket or a club or the like, comprising a programmable microcomputer, an acoustic device in a housing having the shape of a wrist watch, and at least one input device whereby at least one component is designed in the form of a push switch having a cap that can be pulled over the finger of the operator and which starts the execution of the microcomputer program. The microcomputer can be controlled by an input device to put out set acoustic signals indicating specific movements by means of acoustic output devices, preferably a headphone or an inserted earphone and to change the duration, interval and quality of said signals. The invention relates further to a training system for these types of sport having an apparatus of the type mentioned above.

THE PRIOR ART

A training system is known from U.S. Pat. No. 3,808,707A that produces audible signals to assist in achieving optimum performance in the sport of golf, for example. The audible signal varies in frequency, intensity and duration in accordance with the rate of muscular activity and with the level of muscular exertion. The user programs a signal for an "ideal movement" and has then a guide for his movement to be executed during the performance of the sport. However, this is very costly for practice and regular use because of the whole apparatus that is necessary to determine muscular exertion and muscular activity. A similar view is also valid for the sports training device in EP-0 587 622 B1 whereby there are provided audible signals of varying quality and duration for the movement of different body parts of the sportsman. There is also the disadvantage that the sportsman has to memorize many different audible signals and which he must combine with parts of the body and body movement—and this makes concentration very difficult. In addition, this device is very difficult in handling and complicated in operation, which makes regular use practically almost impossible during training and/or when used all over the playing field or the terrain for the execution of the sport, for instance a golf course. The training device, especially made for the sport of golf in WO92/12768-A1 comprises in a relative costly manner a number of sensors attached to various parts of the equipment and to be worn by the golfer whereby said sensors respond to the many different changes during the golf swing and which point out deviations of set values by the change of acoustic signals emitted from a radio-operated headphone. All of the many monitored parameters, on top of the large requirement for equipment, leads to overtaxing and distraction for the sportsman and therefore this device is practically only conditionally usable as well.

It was therefore the object of the invention to provide a training apparatus that is lasting and practical to use and which is small, lightweight and relatively easy and simple to use, and which offers mental support for practicing the sport.

SUMMARY OF THE INVENTION

To achieve this object, it is proposed according to the invention that the acoustic device comprises at least one voice generator to produce at least two different words, that the push switch to start execution of the microcomputer program is fitted with a radio transmitter, and that a radio receiver is disposed in or on the housing containing the microcomputer whereby said radio receiver is connected to said microcomputer. These words help thereby also in concentration and in the mental preparation for the optimum movement, e.g., the optimum golf swing, in contrast to the non-personal and often times even distracting audible signals. Finally, through the design of the portable device in the shape of a wrist watch there is the least possible interference given in practicing the sport and it is also guaranteed that the apparatus may be carried along and used without great physical hindrance during each training session and across the entire course or playing field. The simple operation of the switch that is directly held by one finger does not distract and allows the sportsman to use full concentration for the movement to be performed, such as a golf swing, which avoids at least the interfering starting signal by radio for the microcomputer during transmission, or interference caused by the movement of slightly damaged cable connections.

Since it has been found, especially in the sport of golf, that the back-swing for power and the follow-through swing to strike the golf ball should be of the same duration in time, the optimum movement may be prescribed for the golfer in an especially simple and instantly learnable fashion by two different words having essentially the same duration in time when spoken for these two swing movements so that the golfer does not have to learn at first the complicated combination relating to parts of the body and body movement.

The acoustic output device is provided in or on the housing in the form of a headphone or an inserted earphone is advantageously fitted with a radio receiver and a corresponding radio transmitter. Avoidance of interference in concentration by loose cables is hereby also guaranteed and the risk of damage to the apparatus is minimized.

To further improve concentration and preparation for the optimum movement, it may be proposed that an optical display device is provided for the movement sequence, which in turn is connected to the microcomputer via a corresponding display driver. The additional optical display and guide are a good aid for attitude and concentration for most optically influenced people, especially during final adjustment before the actual movement, for example a golf swing.

Of course, other important data may be made advantageously available to the sportsman if other optical displays for additional playing parameters are provided, e.g., the playing time. A score display or a manually actuated score recorder, a stopwatch and/or a traditional clock may be provided.

In an especially advantageous manner and according to an additional inventive characteristic, there is provided in or on the housing a pitch sensor, an acceleration sensor, or a sensor for centrifugal force, which is connected to the microcomputer and which in turn contains a program that computes various sport-specific values from the data of these sensors and which triggers the acoustic output device or the display device for the acoustic and/or optical output of these values. Such an additional measuring device allows the computation of additional important data via the microcomputer for the sportsman, which could offer him valuable help for positioning, orientation, and also evaluation of the executed movement, such as the executed golf swing. Deviations from the proper distance to the golf ball lying on the ground may thereby be shown before the swing by the pitch of the golf club in the hand of the sportsman. By following the values of the pitch sensor during the swing, measuring of the club-head speed may take place and these values can be displayed for pre-determined or entered values of club lengths. There appears advantageously on the optical display, for example, the range of the swing and/or the speed for control even after the actual swing itself, but only possible deviations from the pre-set ideal values and/or their total amount may be shown on said optical display.

An especially advantageous and inconspicuous attachment into an often times already existing equipment item of the sportsman is provided when the cap, which may be folded over the finger, is a part of the input device component and part of the glove, e.g., a finger of this glove. Especially in the sport of golf, gloves are nearly always an existing part of the equipment, which offers itself in an ideal manner for attachment of the input device.

In the sport of golf, an additional important movement is the upper-body rotation before and during the golf swing, which can be controlled with an expanded training system that comprises an apparatus according to one of the previous paragraphs and which is characterized by a first, preferably battery-powered radio transmitter having a rod antenna whereby said apparatus may be attached to the clothing of the sportsman by means of an attachment device, and by a second radio transceiver at a distance thereof for reception of signals from the first radio transmitter and for relaying said signals to the microcomputer of the training apparatus, whereby said microcomputer contains a program that computes the relative orientation of said two components to one another from the signal strength between the radio transmitter and the radio transceiver, and whereby said program triggers the acoustic output or display devices for the acoustic and/or optical output of these values. From the relative orientation of the rod antenna and the external radio receiver, the degree of rotation of the upper body of the sportsman can be determined by the change of signal strength, the observance of the recommended body rotation can be controlled, or deviations thereof may be displayed in an acoustic and/or optical manner. With such a system, one can also determine or display the rotation of parts of the body relative to one another that are necessary or advantageous—or which are possibly unwanted as well.

The second transceiver is thereby designed as an external, transportable component according to a first embodiment, or it is to be at least temporary stationary, which may be realized, for example, by attachment to or integration into a sport bag. Thereby, there is less stress involved for the sportsman through parts attached to him or to his clothing and the risk of damage can be decreased during practicing of the sport.

According to an additional embodiment, the second radio transceiver may be attached to the clothing of the sportsman by means of a fastening device or the like. For example, an attachment may be provided on the shoes so that during the executed stance, the rotation of the body part may be determined relative to the position of the feet by means of said rod antenna.

An additional inventive embodiment of the training system is characterized by an inertial sensor and preferably a battery-powered radio transmitter connected thereto for the transmission of values of the inertial sensor to the microcomputer, whereby the inertial sensor may be attached to the clothing of the sportsman by means of a fastening device and whereby the microcomputer contains a program that computes the position changes from the change of the signals from the inertial sensor, and whereby the program triggers the acoustic output or display device for the acoustic and/or optical output of these values. An external radio transceiver may be totally avoided thereby and the sportsman has the best-possible freedom of movement as well as no distraction relative to practicing the sport by having to re-arrange a piece of equipment with the external radio transceiver.

A preferred embodiment of the invention in a special design for the sport of golf is explained in more detail in the following description and referring to the attached drawings.

BRIEF DESCRIPTION OF THE DRAWINGS

FIG. 1 illustrates the apparatus according to the invention in use;

FIG. 2 shows a schematic view of some parts of the apparatus in more detail, and FIG. 3 is a schematic illustration of the essential components of the apparatus according to the invention and their mutual interactions.

DETAILED DESCRIPTION OF THE PREFERRED EMBODIMENTS

The use of this apparatus is naturally possible in an advantageous manner in all types of sport in which a ball or the like is played with a racket or a bat or the like to improve the sequence of movement such as in baseball, tennis, etc.

The golf training apparatus consists of three components in its basic configuration. A housing 1 in the shape and approximate size of a wristwatch is provided with a microcomputer 13, a generator for acoustic signals, particularly a voice chip 12, and possibly one or a plurality of traditional optical display devices 7, 10 with analog and/or digital display panels, possibly also a number of light-emitting diodes (LED) or the like. There is especially provided also a clock and/or stopwatch and/or a score counter, a counter for counting each round, and a strike counter. Additionally, there are integrated in the housing a radio receiver and transmitter 6 as well as an actuation element for programming and/or for fetching programs stored in the microcomputer, and a guide for specific parameters, eg., specific type of clubs or swing ranges and swing duration times for so-called "slow hitter" or "fast hitter", as well as for input values to be displayed and/or to be stored, such as the current score, for example, whereby said housing 1 may be worn on the wrist like a traditional watch and fastened by means of a fastening band. Said actuation elements are preferably in the form of push buttons and/or turn buttons, which are preferably arranged laterally along the circumference of the housing. A similar design is proposed for other types of sport besides golf by having displays designed especially for the specific type of sport, of course.

The radio receiver 6 receives signals from the second component of the apparatus, which has a radio transmitter 5, for the start or for adjustment to specific operational modes and which transmitter 5 relays the signals to the microcomputer 13, whereby said second component of the apparatus has a push switch 2 that may be fastened around the finger of the golfer in the way of a cap 3. The switch 2 can thereby also be integrated in or on a golf glove 4, preferably at the end part for a finger of the sportsman, in a manner whereby the cap 3 is formed by a part of the glove 4. The advantage is thereby that the switch 2 is retained very securely and well within an exactly defined location. The energy for operation of the radio transmitter 5 originates from a small battery and the energy for operation of the microcomputer 13, the acoustic devices 12, and the display device(s) 7, 10 in the housing is drawn from an additional battery in the housing. The arrangement of a push switch 2 on a cap 3 that is pulled over a finger is suitable in the same way for any type of sport in which a racket is held.

The third component of the apparatus is a headphone 8 or inserted earphone functioning by radio and equipped with a receiver 9, an antenna, and an additional battery, by which the golfer may hear the acoustic signals of the voice chip 12. Even though a traditional loudspeaker in the housing 1 would be conceivable, an inserted earphone or headphone 8 is preferably used since its signals are interfered with to a lesser degree by external noise, they may be heard clearer, and the signals do not disturb other sportsmen in their concentration.

Especially in the sport of golf, there is a voice generator 12 designed to produce two different words of essentially the same duration in time when spoken with a short pause in between, which is to determine the range of the back-swing, the follow-through swing and the pause being in between for the change in direction, since it has been found that the back-swing for power and the follow through swing to strike the golf ball should be equal in duration. Through the appropriate selection of the produced word, and subsequent playback of the words to the golfer, not only the optimum movement for each type of golfer may be prescribed—which can occur at several selected measured variations of duration in time—but these words may be helpful also in their tone or sense for concentration and mental preparation for the optimum golf swing. Through optical assistance via an optical display, e.g., a display 7 that lights up corresponding to the length of the word—and in addition to the voice signals, there can be achieved an added favorable help in attitude and concentration for the optimum golf swing for most optically influenced people. After completion of the swing, a comparison between the set value for the swing and its actual duration may be shown via the optical display 7 and evaluated by the sportsman including, in a separate way, the two partial movements. Movements of varying range and direction are also of advantage in other types of sport, which nevertheless should have equal duration in time so that in this case, mental support in the uniform execution of these sequences of movement is also of advantage with the aid of the inventive arrangement.

In or on the housing 1 there is a pitch sensor 11 provided in an especially advantageous manner that is connected to the microcomputer 13. The microcomputer 13 contains thereby also a program that interrogates this sensor at several intervals, once after the actuation of the input device 2 or corresponding to the program sequence, and which computes from the sensor's data one or several golf-specific parameters and which triggers the acoustic output or display device for the acoustic and/or optical output of these values. In this way, the pitch sensor delivers also a value for the inclination of the golf club, e.g., before the swing in reference to the hand position, whereby the distance to the golf ball lying on the ground or the deviation from the correct distance may be made audible or may be displayed optically through a fixed pre-programmed club length or through a club length that may be entered into the input device.

When the duration in time is determined during which the values of pitch are changed, then the speed of the club head may be determined based on these values of the pitch measuring device together with the used time. An average club length can again be pre-programmed thereby or a specific club length may be entered possibly also through selection of one value out of some of the pre-determined values. The range of the swing can be derived from the beginning and the end of the changing pitch values in relation to the time used. The values of the club-head speed could also be determined, for example, through evaluation of data from an acceleration sensor or a sensor for centrifugal force via the program in the microcomputer 13.

An important parameter in the golf swing is the rotation of the upper body during the swing. This rotation can be controlled with an expanded golf training system, which comprises in addition to the above-mentioned components preferably a battery-powered additional radio transmitter 14 that is provided with a rod antenna 15, which may be attached to the clothing of the golfer by means of a fastening device 16. This attachment should be essentially horizontal and it should be advantageously in line with the shoulders of the sportsman. Furthermore, there is an external radio transceiver 17 disposed on or in a golf bag 18, which may be switched on or off according to demand and whereby the signal strength varies according to the relative position of the rod antenna 15 and the radio transceiver 17. The microcomputer 13 can compute the relative orientation of these two components 15, 17 to one another via a program stored in the microcomputer 13 from the strength of the signals relayed from the radio transmitter 17 disposed preferably in the golf bag 18, and furthermore to trigger the output 12 or the display device 10 for the acoustic and/or optical display of the conformity or deviation from the optimum or set values. It is important thereby that the golfer places the radio transceiver 17 always on the same location relative to his own position.

Instead of tying the external radio transceiver 17 to a golf bag 18 or a similar item to be brought along, this radio transceiver may be attached alternatively to a part of the body of the sportsman, preferably again on this clothing. In case of the above-mentioned exemplary determination of the correct rotation of the upper body, there could be a second radio transceiver 19 be attached to a shoe of the golfer or it may be attached to both shoes. It is also conceivable that the upper body rotation of the golfer is documented by only a single inertial sensor 20, e.g., a gyroscope, which spatial orientation is stored before execution of the movement as reference value and which change in position is transmitted to the microcomputer 13 via a radio transmitter 21 connected to said sensor 20. Additional possibilities for measuring the relative rotation are contained in the use of magnetic or electric monopoles or of polarized waves.

Instead of the desired rotation of parts of the body of the sportsman relative to one another, one can naturally monitor whether two body parts maintain a prescribed position relative to one another also during the movement. This would be of significance in the sport of golf, for example, whereby the golfer's head has to be held still during the golf swing. The correct head position could be monitored by means of a rod antenna on his/her golf cap or also on the possible inserted earphone or headphone 8 of the training apparatus itself, and by a second radio transceiver 19 on the body of the sportsman or on his shoes, for example. Monitoring via a single inertial sensor is also possible, which may be provided again on the headgear of the sportsman or on the inserted earphone or headphone 8.

The invention claimed is:

1. A training apparatus for a person practicing a sport that uses a racket or club and a ball, said training apparatus comprising:

first component which includes a housing configured as a wrist watch to be worn by the person; an input element; an acoustic generator which includes an acoustic voice generator for emitting signals that generate at least two different words of equal duration when spoken, with a short pause in between said words, which is to determine the duration of a back-swing, a forward swing, and the pause in between said words being for a change in direction; a microcomputer for sending activating signals to said acoustic generator; a radio receiver for receiving signals from a second component and for activating said microcomputer; and actuating elements for programming said microcomputer, and a second component which includes a glove for a hand of the person, a push switch that includes a cap for positioning over a finger of the person, and a radio transmitter, said push switch causing said radio transmitter to send a signal to said radio receiver to activate said microcomputer.

2. A training apparatus according to claim 1, including a third component that comprises a headphone and a radio receiver.

3. A training apparatus according to claim 1, wherein said first component includes a pitch sensor, an acceleration sensor or a centrifugal force sensor which is connected to said microcomputer, and wherein said microcomputer contains an operating program which computes sport-specific values from sensor data, which values activate said acoustic output device or are displayed on an optical display device.

4. A training apparatus according to claim 1, including an optical display device for displaying information relating to the sport and an optical driver for driving said optical display device, and wherein said microcomputer is arranged to send activating signals to said optical driver.

5. A training apparatus according to claim 1, wherein the microcomputer is arranged to calculate desired durations for the back-swing, the pause, and the forward swing, and to control the generation of the at least two different words correspondingly.

6. A training system for a person practicing a sport that uses a racket or club and a ball, said training apparatus comprising:

a first component which includes a housing configured as a wrist watch to be worn by the person; an input element; an acoustic generator which includes an acoustic voice generator for emitting signals that can generate at least two words of equal duration; an optical display device for displaying information relating to the sport; an optical driver for driving said optical display device; a microcomputer for sending activating signals to said acoustic output device and to said optical driver; a first radio transceiver for receiving signals from a second component and for activating said microcomputer; and actuating elements for programming said microcomputer, a second component which includes a glove for a hand of the person, a push switch that includes a cap for positioning over a finger of the person, and a first radio transmitter; said push switch causing said radio transmitter to send a signal to said first radio transceiver to activate said microcomputer;

a second radio transmitter with rod antenna for attachment to the person's clothing, and a second radio transceiver located at a distance from the second radio transmitter for relaying signals from said second radio transmitter to said microcomputer, said microcomputer computes relative orientation of said second radio transmitter and said second radio transceiver from the relative strength of signals received therefrom and causing said acoustic voice generator or optical output device to output corresponding sounds or visual data.

7. A training system according to claim 6, including a sports bag for containing said second radio transceiver.

8. A training system according to claim 6, wherein said second radio transceiver includes attachment means for attachment to the person's clothing.

9. A training system according to claim 6, including an inertial sensor and a battery-powered third radio transmitter connected thereto for transmission of values of the inertial sensor to the microcomputer, whereby said inertial sensor may be attached to clothing of a sportsman by means of a fastening device, and whereby the microcomputer computes position changes from a change of the signals from the inertial sensor, and whereby said program triggers the acoustic output or display device for the acoustic and/or optical output of these values.

* * * * *